(12) United States Patent
Oh et al.

(10) Patent No.: US 9,517,768 B2
(45) Date of Patent: Dec. 13, 2016

(54) METHOD FOR OBJECT PROCESSING AND VEHICLE SUPPORTING THE SAME

(71) Applicant: Hyundai Motor Company, Seoul (KR)

(72) Inventors: Young Chul Oh, Seongnam-si (KR); Myung Seon Heo, Seoul (KR); Kyung Ho Yoo, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/304,588

(22) Filed: Jun. 13, 2014

(65) Prior Publication Data

US 2015/0158489 A1   Jun. 11, 2015

(30) Foreign Application Priority Data

Dec. 9, 2013  (KR) .................. 10-2013-0152293

(51) Int. Cl.
| | | |
|---|---|---|
| *A01B 69/00* | (2006.01) | |
| *B60W 30/09* | (2012.01) | |
| *B60W 30/14* | (2006.01) | |
| *G01S 17/93* | (2006.01) | |
| *B60W 40/04* | (2006.01) | |
| *G01S 17/89* | (2006.01) | |
| *B60W 50/14* | (2012.01) | |
| *G06K 9/00* | (2006.01) | |
| *G06K 9/20* | (2006.01) | |
| *G06K 9/62* | (2006.01) | |

(52) U.S. Cl.
CPC ............ *B60W 30/09* (2013.01); *B60W 30/143* (2013.01); *B60W 40/04* (2013.01); *G01S 17/89* (2013.01); *G01S 17/936* (2013.01); *B60W 2050/143* (2013.01); *B60W 2550/30* (2013.01); *G06K 9/00805* (2013.01); *G06K 9/2036* (2013.01); *G06K 9/6218* (2013.01)

(58) Field of Classification Search
CPC .... B60W 30/09; B60W 30/143; B60W 10/04; B60W 2550/30; B62D 6/00; G01S 17/936
USPC ........ 701/25, 41, 70, 78, 300, 310; 340/436, 340/438, 903
See application file for complete search history.

(56) References Cited

U.S. PATENT DOCUMENTS 7,620,203 B1\* 11/2009 Simmons ............. G06K 9/0063
                                                    382/103
8,591,830 B2\* 11/2013 Sudarsan .......... B01L 3/502761
                                                    422/417
(Continued)

FOREIGN PATENT DOCUMENTS

JP      2008-165438 A      7/2008
JP      2010-032430 A      2/2010
(Continued)

*Primary Examiner* — Shardul Patel
(74) *Attorney, Agent, or Firm* — McDermott Will & Emery LLP

(57) ABSTRACT

A vehicle for supporting an object processing includes a lidar sensor configured to collect multi-layer data corresponding to sensor information for a lateral surface for each vertical interval. A controller is configured to classify objects by clustering each layer for the multi-layer data, extract contours and shapes of the objects, and then control a convergence of the objects based on a calculated value of a Mahalanobis distance between the clustered objects, and a method for an object processing.

4 Claims, 7 Drawing Sheets

(56) References Cited

U.S. PATENT DOCUMENTS

| | | | | |
|---|---|---|---|---|
| 8,682,109 B2 * | 3/2014 | Kang | ............... | G06T 3/4053 |
| | | | | 345/698 |
| 8,730,090 B2 * | 5/2014 | Nakahama | ............ | G01S 7/295 |
| | | | | 342/159 |
| 2005/0021201 A1 * | 1/2005 | Klotz | ............... | B60W 30/16 |
| | | | | 702/189 |
| 2010/0053320 A1 * | 3/2010 | Chen | ............... | G06K 9/00805 |
| | | | | 348/135 |
| 2010/0063736 A1 * | 3/2010 | Hoetzer | ............ | B60W 30/09 |
| | | | | 701/301 |
| 2010/0098290 A1 * | 4/2010 | Zhang | ............... | B60W 30/00 |
| | | | | 382/100 |
| 2011/0086377 A1 | 4/2011 | Thwar et al. | | |
| 2011/0109492 A1 | 5/2011 | Nakahama | | |
| 2012/0051667 A1 | 3/2012 | Kang et al. | | |
| 2013/0218396 A1 * | 8/2013 | Moshchuk | ............ | B60W 50/08 |
| | | | | 701/25 |

FOREIGN PATENT DOCUMENTS

| | | |
|---|---|---|
| JP | 2011-099836 A | 5/2011 |
| JP | 2012-247829 A | 12/2012 |
| KR | 10-2009-0063450 A | 6/2009 |
| KR | 10-2010-0133943 A | 12/2010 |
| KR | 10-2012-0020008 A | 3/2012 |
| KR | 10-2013-0004746 A | 1/2013 |

\* cited by examiner

A : L SHAPE

B : CURVE SHAPE

C : FIRST STRAIGHT LINE SHAPE

D : SECOND STRAIGHT LINE SHAPE

METHOD FOR OBJECT PROCESSING AND VEHICLE SUPPORTING THE SAME

CROSS-REFERENCE TO RELATED APPLICATION

This application is based on and claims the benefit of priority to Korean Patent Application No. 10-2013-0152293, filed on Dec. 9, 2013 in the Korean Intellectual Property Office, the disclosure of which is incorporated herein in its entirety by reference.

TECHNICAL FIELD

The present disclosure relates to a sensor information processing of a vehicle, and more particularly, to a method for an object processing supporting classification and convergence processes of objects distributed in a multi-layer and a vehicle control accordingly, and a vehicle supporting the same.

BACKGROUND

In order to support various safety services, a vehicle needs to observe surroundings thereof. To this end, the vehicle includes a surrounding observing device. For example, the vehicle includes a lidar sensor. The lidar sensor transmits a signal toward a front direction or the like and analyzes a feedback signal, thereby generating a video image. During this process, the lidar sensor divides upper and lower sides of the front thereof into predetermined layers and obtains the video image for each layer. That is, the lidar sensor according to the related art supports a multi-layer image.

However, since the image generated based on the multi-layer has a significant amount of data distribution to be determined to support a specific service, it has several problems. Therefore, it is necessary to converge the same object among objects for each multi-layer. In order to solve this problem, according to the related art, the image has been processed based on a state in which the objects for each layer are overlapped. However, in the case in which the image is simply processed based on the overlapped state, it is impossible to finely distinguish between the objects. This may potentially make a risk prediction of the vehicle or avoidance difficult.

SUMMARY

The present disclosure has been made to solve the above-mentioned problems occurring in the prior art while advantages achieved by the prior art are maintained intact.

An aspect of the present disclosure provides a method for an object processing capable of performing a further improved clustering by converging multi-layer data in recognizing an object shape from an observed image, and a vehicle supporting the same.

According to an exemplary embodiment of the present disclosure, a vehicle for supporting an object processing is provided. The vehicle includes a lidar sensor configured to collect multi-layer data corresponding to sensor information for a lateral surface for each vertical interval. A controller is configured to classify objects by clustering each layer for the multi-layer data, extract contours and shapes of the objects, and then control a convergence of the objects based on a calculated value of a Mahalanobis distance between the clustered objects.

The controller may check whether or not the objects are overlapped and calculates the Mahalanobis distance in the case in which the objects are overlapped.

The controller may select an object having the largest size among the objects as a reference object and calculates Mahalanobis distances between the reference object and other objects.

The controller may converge two objects used for the distance calculation in the case in which the Mahalanobis distance is equal to or less than a reference value, and classifies the two objects used for the distance calculation into different objects in the case in which the Mahalanobis distance is larger than the reference value.

The controller may perform at least one of a distance calculation between an own vehicle and surrounding geographic features, a speed detection of other vehicles and a distance calculation from other vehicle based on a converged image of the objects.

The vehicle may further include a safety service supporter performing at least one of an alarm sound output, a vehicle speed control, and a steering control based on at least one of a distance value and a speed value calculated based on the converged image of the objects.

According to another exemplary embodiment of the present disclosure, a method for an object processing includes obtaining multi-layer data including sensor information for a lateral surface for each vertical interval. Objects are classified by clustering each layer for the multi-layer data. Shapes and contours of the clustered objects are extracted. A Mahalanobis distance between the clustered objects is calculated, and the objects are converged according to the Mahalanobis distance.

The step of calculating the Mahalanobis distance may include checking whether or not the objects are overlapped, and calculating the Mahalanobis distance in the case in which the objects are overlapped.

The step of calculating the Mahalanobis distance may further include selecting an object having the largest size among the objects as a reference object, and calculating Mahalanobis distances between the reference object and other objects.

The step of converging the objects may include converging two objects used for the distance calculation in the case in which the Mahalanobis distance is equal to or less than a reference value. The two objects used for the distance calculation are classified into different objects in the case in which the Mahalanobis distance is larger than the reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in more detail with reference to the accompanying drawings. However, in describing the exemplary embodiment of the present disclosure, technology contents well known in the art to which the present disclosure pertains and directly not related to the present disclosure will be omitted, if possible. This is to more clearly deliver the key point of the present disclosure so as not to obscure the present disclosure by omitting an unnecessary description.

Figure 1:
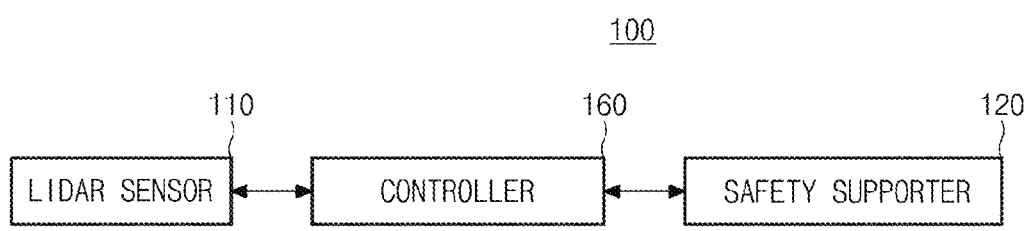
FIG. 1 shows a schematic configuration of a vehicle supporting a method for an object processing according to an exemplary embodiment of the present disclosure.

FIG. 1 shows a schematic configuration of a vehicle supporting a method for processing an object processing according to an exemplary embodiment of the present disclosure. Referring to FIG. 1, a vehicle 100 according to an exemplary embodiment of the present disclosure may include a light detection and ranging (lidar) sensor 110, a controller 160, and a safety service supporter 120.

The vehicle 100 according to an exemplary embodiment of the present disclosure including the above-mentioned configuration supports object extraction from a plurality of multi-layer images collected by the lidar sensor 110 and object convergence which may be converged among the extracted objects. Therefore, the vehicle 100 according to an exemplary embodiment of the present disclosure may perform an improved data processing based on an image having the converged object and may support a safety service based on a result according to the data processing.

The lidar sensor 110 shoots a laser to surrounding geographic features, for example, another vehicle and senses the laser reflected from the other vehicle by a scanner to thereby observe a time that the laser is reflected and is returned, and thereby calculating a distance to an object. In addition, the lidar sensor 110 may measure a moving speed of the other vehicle. That is, the lidar sensor 110 may collect sensor information for measuring a predetermined parameter, for example, a distance between the vehicles and a relative speed. Particularly, the lidar sensor 110 according to an exemplary embodiment of the present disclosure may transversally irradiate the laser at a vertically constant height to thereby collect a feedback signal therefrom. In this case, the lidar sensor 110 may transversally irradiate the laser at a plurality of heights to thereby collect the sensor information in a multi-layer form. The sensor information collected by the lidar sensor 110 may be transmitted to the controller 160. In this case, the sensor information in the multi-layer form transmitted by the lidar sensor 110, that is, multi-layer data may include information of a plurality of points disposed on a plurality of layer surfaces.

The controller 160 may collect the sensor information in the multi-layer form, for example, the multi-layer data collected by the lidar sensor 110 and may converge the objects based on the collected sensor information. During this process, the controller 160 may perform an improved object classification by taking into account data distribution and may perform the object convergence based on recognition of the corresponding object. The controller 160 may perform the object convergence by a configuration shown in FIG. 2. Meanwhile, the controller 160 may convert the multi-layer data into an object converged image and may transmit the object converged image to the safety service supporter 120.

The safety service supporter 120 may receive the object converged image from the controller 160 and may perform a specific safety service based on the received object converged image. For example, the safety service supporter 120 may more accurately calculate speed and distance information of the object by applying object information detected from the object converged image to tracking algorithm information. In addition, the safety service supporter 120 may perform a control such as an output of an alarm sound, deceleration of the vehicle speed, a change of a vehicle's moving direction, or the like by checking a distance between the detected object and an own vehicle. To this end, the safety service supporter 120 may include an alarm sound output, a vehicle speed controller, a steering controller, and the like.

Figure 2:
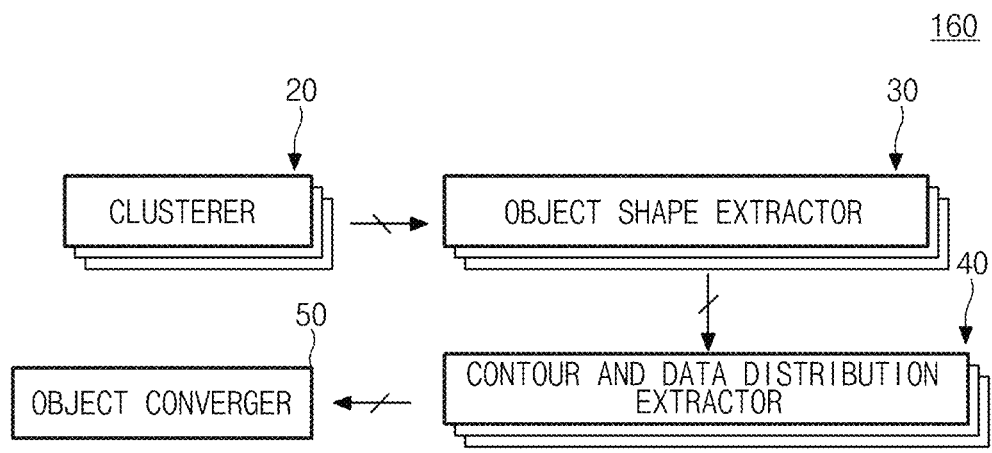
FIG. 2 shows a configuration of a controlling module of vehicle configurations according to an embodiment of the present disclosure in more detail.

FIG. 2 is a view showing a configuration of a controller of vehicle configurations according to an embodiment of the present disclosure in more detail. In addition, FIG. 3 describes a clustering performance for each layer, FIG. 4 describes an object extraction, and FIGS. 5 and 6 describe an object convergence.

Referring to FIG. 2, the controller 160 according to an exemplary embodiment of the present disclosure may include a clusterer 20, an object shape extractor 30, a contour and data distribution extractor 40, and an object converger 50.

Figure 3:
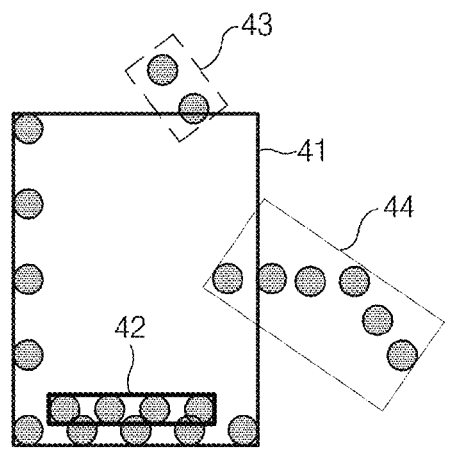
FIG. 3 describes a clustering performance for each layer.

Referring to FIGS. 2 and 3, the clusterer 20 has a configuration of clustering a plurality of points for each layer in multi-layer data configured of the plurality of points transmitted by the lidar sensor 110. That is, the clusterer 20 may cluster predetermined points for each layer into one group in multi-layer data. To this end, the clusterer 20 may be configured to include a plurality of clusterers or clustering processors. The plurality of clusterers may perform a clustering process for the points arranged for each layer in the multi-layer data. Describing based on FIG. 3, the clusterer 20 may cluster the plurality of points into four objects 41, 42, 43, and 44 by clustering the plurality of points, which are arranged for four layers, for each layer.

Figure 4:
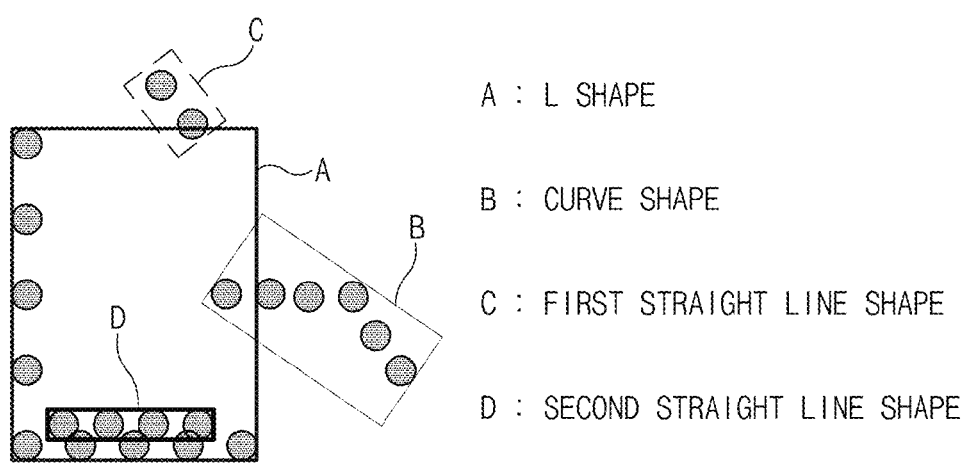
FIG. 4 describes an object extraction.

Referring to FIGS. 2 and 4, the object shape extractor 30 has a configuration extracting shapes of the objects classified by clustering for at least one point for each layer. In the case in which the clusterer 20 is configured to include the plurality of clusterers, the object shape extractor 30 may receive data for each layer from the respective clusterers and perform an object shape extraction for each layer. To this end, the object shape extractor 30 may also be configured to include a plurality object shape extractors or object shape extracting processors. This object shape extractor 30 may extract a predetermined shape based on the plurality of clustered points as shown in FIG. 4. For example, the object shape extractor 30 may extract various object shapes such as an "L" shape A, a "curve" shape B, a "first straight line" shape C, a "second straight line" shape D, and the like.

The contour and data distribution extractor 40 may extract a contour from the extracted object shape and may perform a data distribution analysis. In this case, the contour and data distribution extractor 40 may preferentially perform the contour extraction and data distribution analysis for a predefined specific object among the objects for each multi-layer and may analyze a contour extraction and data distribution of other objects based on the performed contour extraction and data distribution analysis. For example, the contour and data distribution extractor 40 may detect an object having the largest size among the objects as a reference object and may perform the contour extraction and data distribution analysis for the detected reference object.

In addition, the contour and data distribution extractor 40 may analyze the contour extraction and data distribution for the objects having the next largest size. The contour and data distribution extractor 40 may transmit a result of the contour and data distribution for the reference object to the object converger 50. In addition, the contour and data distribution extractor 40 may transmit results of the contour and data distribution for other objects to the object converger 50. The contour and data distribution extractor 40 may perform the contour and data distribution analysis of each object randomly or according to a detected sequence for the objects extracted by the object shape extractor 30 without selecting a separate reference object and may transmit the result of the contour and data distribution analysis to the object converger 50. Further, in the case in which the object shape extractor 30 is configured to include the plurality of units, the contour and data distribution extractor 40 may be configured to include the plurality of units or processors connected to the respective object shape extractors. In addition, the contour and data distribution extractor 40 configured by the plurality of units may transmit the calculated values of the contour and data distribution for the objects for each layer to the object converger 50.

Referring to FIGS. 2 to 7, the object converger 50 may perform the object convergence by comparing the values of the contour and data distribution for the objects transmitted by the contour and data distribution extractor 40. For example, in the case in which the contour and data distribution extractor 40 transmits the reference object, the object converger 50 may calculate a Mahalanobis distance for other objects based on the transmitted reference object. Here, the object converger 50 may perform a Mahalanobis distance calculation between the contour distribution of the reference object and a contour intermediate value of the other object. The Mahalanobis distance may be calculated by the following Equation 1.

$$d(a,b)=(a-b)^{T}\Sigma^{-1}(a-b) \quad \text{[Equation 1]}$$

Figure 5:
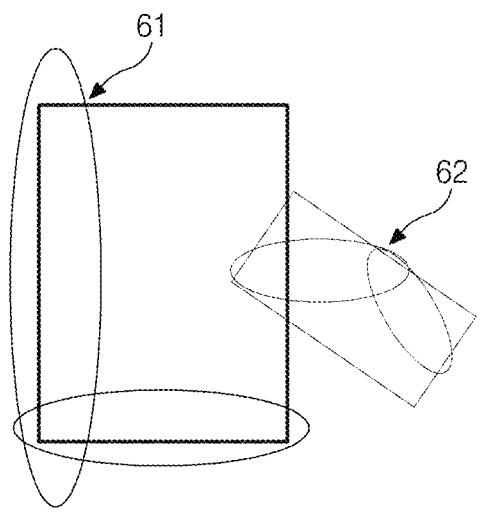
FIGS. 5 and 6 describe an object convergence.
Figure 6:
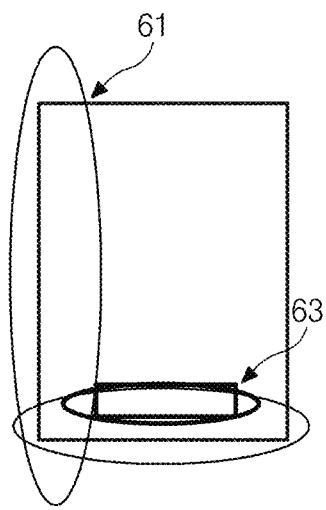

In Equation 1, d (a,b) is a Mahalanobis distance between specific points "a and b" and $(a-b)^T$ is a transformation matrix, and $\Sigma^{-1}(a-b)$ is an inverse matrix of a covariance matrix. The covariance matrix may be calculated based on the data distribution of the points. During this process, in the case in which the Mahalanobis distance is larger than a preset value, the object converger 50 does not perform the object convergence by considering the objects as different objects. In addition, in the case in which the Mahalanobis distance is equal to or less than the preset value, the object converger 50 may perform the object convergence by determining the objects as the same objects as each other. Referring to the drawings, as shown in FIG. 5, in the case in which a first object 61 and a second object 62 are disposed, the Mahalanobis distance between the first object 61 and the second object 62 is calculated to be larger than the preset value. As a result, the object converger 50 may recognize the first object 61 and the second object 62 as the different objects. Meanwhile, as shown in FIG. 6, in the case in which the first object 61 and a third object 63 are disposed, the Mahalanobis distance between the first object 61 and the third object 63 has the preset value or less. As a result, the object converger 50 may estimate correlation between the first object 61 and the third object 63 to be very high and may perform a convergence of the first object 61 and the third object 63 according to the estimation. The object converger 50 may attempt to converge all objects included in the multi-layer for the convergence of the objects with reference to the reference object and may transmit the result thereof to the safety service supporter 120. That is, the object converger 50 may determine whether the convergence between the reference object and other objects is performed and control the convergence of the objects, thereby generating a converged image.

Figure 7:
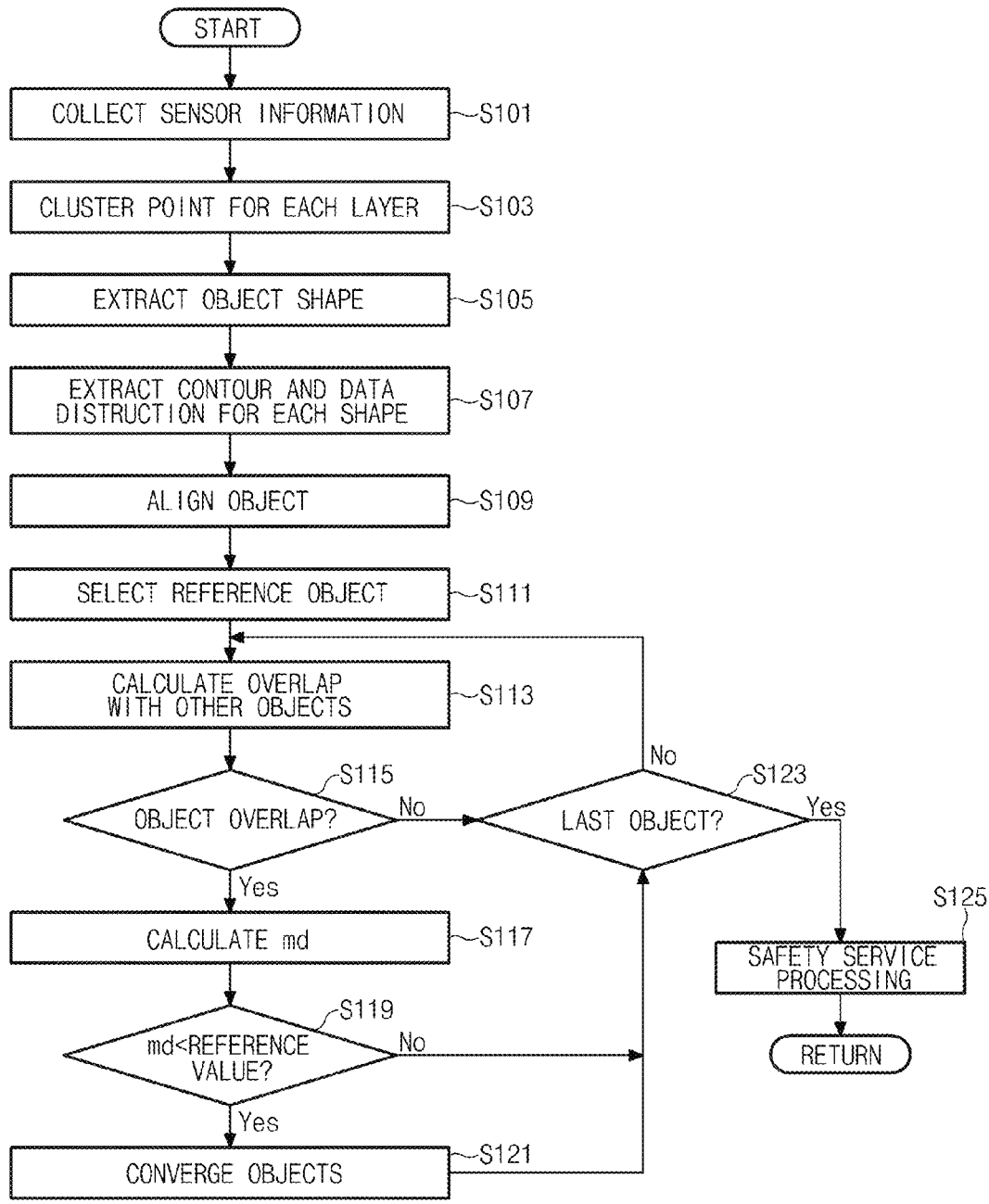
FIG. 7 describes a method for an object processing according to an exemplary embodiment of the present disclosure.

FIG. 7 is a view for describing a method for an object processing according to an exemplary embodiment of the present disclosure.

Referring to FIG. 7, in the method for processing the object according to an exemplary embodiment of the present disclosure, the vehicle 100 may collect sensor information (S101). The vehicle 100 may control the lidar sensor 110 to be activated in the case in which an object convergence application request is set to a default or the request is generated in response to schedule information. Alternatively, the vehicle 100 may control the lidar sensor 110 to be activated when a specific mode for supporting the safety service is activated. In addition, the vehicle 100 collects sensor information for each vertically constant interval using the lidar sensor 110. Therefore, the vehicle 100 may obtain multi-layer data configured by lateral surfaces having at least one point disposed thereon for each vertically constant interval.

In addition, the controller 160 of the vehicle 100 may perform the point clustering for each layer (S103). That is, the controller 160 may performing a clustering of the points disposed for each layer with respect to multi-layer data transmitted by the lidar sensor 110. During this process, the controller 160 may perform the data clustering by taking into account distribution characteristics of data.

The controller 160 may extract the object shape (S105). Next, the controller 160 may extract the object shape based on a clustered state of the points. For example, the controller 160 may extract various object shapes such as a straight line, a curve or an L shape depending on the clustering state of the points. Next, the controller 160 may extract contour and data distribution for each shape (S107). The contour for each shape may be calculated according to disposed characteristics of the points. The controller 160 may calculate the covariance matrix based on the extraction of the data distribution.

Next, the controller 160 may align the objects (S109). In this case, the controller 160 may align the objects in order of size. Particularly, the controller 160 may align N objects in descending order. When the alignment of the size is complete, the controller 160 may select a reference object (S111). The reference object may be, for example, an object having the largest size among the objects.

When the reference object is selected, the controller 160 may calculate an overlap between the other object and the reference object (S113). The controller 160 may compare between the reference object and the object having the next largest size based on the object aligned in the descending order and may then sequentially calculate the overlap between the reference object and other objects such as a method of comparing between the reference object and an object having the third largest size.

In addition, the controller 160 may check whether or not the overlap is present between the reference object and a specific object (S115). In the case in which the overlap is present between the reference object and the specific object in S115, the controller 160 may calculate the Mahalanobis distance and between two objects (S117). In this case, the controller 160 may calculate the Mahalanobis distance for the contour distribution of the reference object and a contour intermediate value of the specific object.

In addition, the controller 160 may check whether or not the Mahalanobis distance is equal to or less than a reference value (S119). In the case in which the Mahalanobis distance between the two objects, that is, the reference object and the specific object is equal to less than the reference value, the controller 160 may branches to S121 to perform the object convergence.

In the case in which the overlap is not present between the reference object and the specific object in S115, the controller 160 may branch to S123 to check whether or not the specific object which is currently compared with the reference object is the last object to be compared. In the case in which the specific object is not the last object to be compared, the controller 160 may branch to before S113 to perform the following processes. During the re-processing, the controller 160 may select other objects except for the previously selected object as the specific object to compare with the reference object. In the case in which the current compared object is the last object in S123, the controller 160 may branch to S125 to perform a safety service process based on object convergence complete information. During the safety service process, the controller 160 may support various safety services based on tracking, speed check, a relationship with own vehicle, or the like of the objects using the converged image. For example, the controlling module 160 may perform at least one of an alarm sound output, a vehicle speed control, and a steering control.

In addition, in the case in which the Mahalanobis distance is larger than the reference value in S119, the controller 160 may skip S121 and branch to S123.

Additionally, the controller 160 may select the object having the largest size among the objects which are not converged into the reference object, except for the selected reference object, for example, the object having the largest size among a plurality of objects as a second reference object. In addition, the controller 160 may perform an overlap, the Mahalanobis distance calculation and the like between the second reference object and other objects and may control the object convergence of the second reference object according to whether or not the overlap is present and the Mahalanobis distance. In this case, the controller 160 may exclude the already converged object from the convergence process with the second reference object. The controller 160 may perform a throughout convergence process for the plurality of objects by the above-mentioned processes and may support the image based on sensor information provided in a multi-layer data form to be more simplified.

Figure 8A:
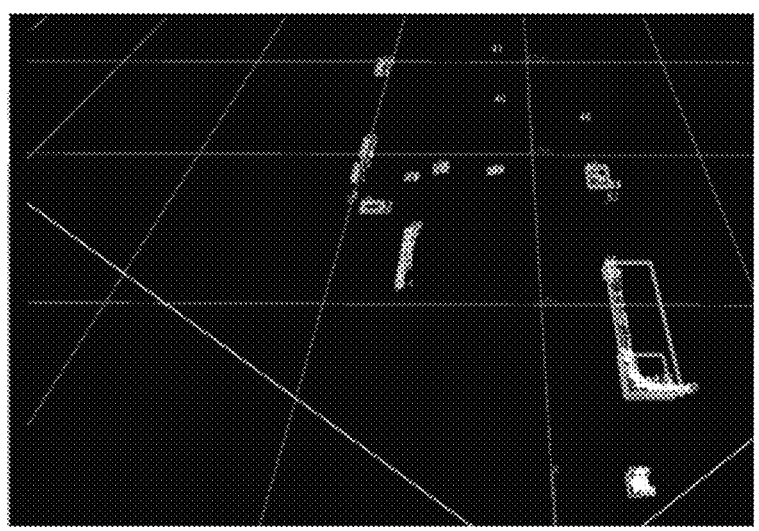
FIGS. 8A and 8B each show an object converged screen of a layer collected by a lidar sensor.
Figure 8B:
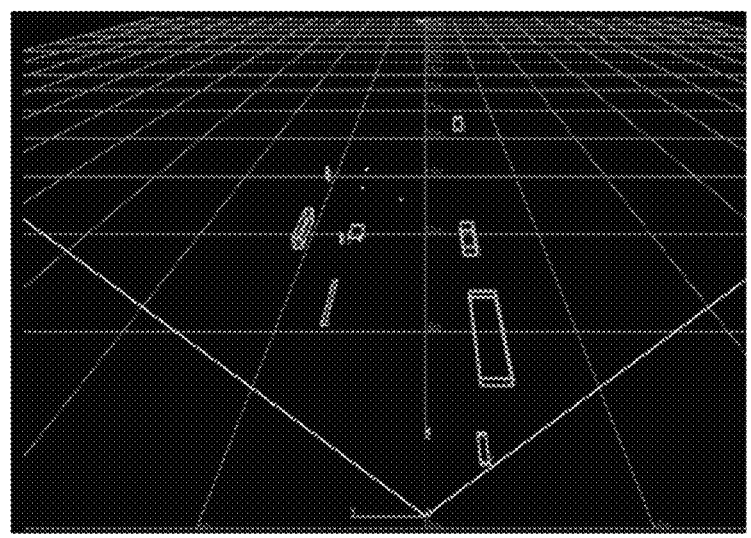

FIGS. 8A and 8B are views each showing an object converged screen of a layer collected by a lidar sensor.

Particularly, FIG. 8A is a view showing a screen in which the object convergence is performed based on an area reference value. Further, FIG. 8B is a view showing the object converged screen by the object processing according to an exemplary embodiment of the present disclosure. As shown in FIGS. 8A and 8B, it may be seen that the image by the object processing according to an exemplary embodiment of the present disclosure includes more simple information and shows a clear form of the objects. As a result, the present disclosure may support the performance of a more fast and accurate tracking of the object, a speed calculation of the object, a position of the object, an operation of a spatial relationship with the own vehicle, or the like based on the simplified object converged image.

The method for the object processing and the vehicle supporting the same may allow the object of the multi-layer to be clustered, may extract height information of the object according to characteristics of the lidar sensor, and may be utilized for recognizing the kind of object by recognizing the object shape.

In addition, according to an exemplary embodiment of the present disclosure, speed information and distance information of the object may be more accurately calculated by applying more accurately clustered object information to tracking algorithm information, thereby supporting various vehicle safety services.

The exemplary embodiments of the present disclosure have been disclosed in the present specification and the accompanying drawings and specific terms have been used, but are just used in a general meaning in order to easily describe the technical content of the present disclosure and assist in understanding the present disclosure and do not limit the scope of the present disclosure. It is obvious to those skilled in the art to which the present disclosure pertains that various modifications may be practiced based on the technical idea of the present disclosure, in addition to the exemplary embodiments disclosed herein.

What is claimed is:

1. A vehicle for supporting an object processing, the vehicle comprising:
a lidar sensor configured to collect multi-layer data corresponding to sensor information for a lateral surface for each vertical interval; and
a controller configured to classify objects by clustering each layer for the multi-layer data, extract contours and shapes of the objects and then control a convergence of the objects based on a calculated value of a Mahalanobis distance between the clustered objects,
wherein the controller checks whether or not the objects are overlapped and calculates the Mahalanobis distance in a case in which the objects are overlapped, and
wherein the controller converges two objects used for the Mahalanobis distance calculation in a case in which the Mahalanobis distance is equal to or less than a reference value and classifies the two objects into different objects in a case in which the Mahalanobis distance is larger than the reference value.

2. The vehicle according to claim 1, wherein the controller selects an object having the largest size among the objects as a reference object and calculates Mahalanobis distances between the reference object and other objects.

3. The vehicle according to claim 1, wherein the controller performs at least one of a distance calculation between an own vehicle and surrounding geographic features, a speed detection of other vehicles and a distance calculation from another vehicle based on a converged image of the objects.

4. The vehicle according to claim 3, further comprising a safety service supporter performing at least one of an alarm sound output, a vehicle speed control, and a steering control based on at least one of a distance value and a speed value calculated based on the converged image of the objects.

* * * * *